United States Patent
Moireau

(10) Patent No.: US 7,241,499 B2
(45) Date of Patent: Jul. 10, 2007

(54) SIZING COMPOSITION FOR GLASS YARNS, THE GLASS YARNS THUS OBTAINED AND COMPOSITE MATERIALS COMPRISING SAID YARNS

(75) Inventor: Patrick Moireau, Curienne (FR)

(73) Assignee: Saint-Gobain Vetrotex France S.A., Chambery (FR)

( * ) Notice: Subject to any disclaimer, the term of this patent is extended or adjusted under 35 U.S.C. 154(b) by 59 days.

(21) Appl. No.: 10/496,791

(22) PCT Filed: Dec. 5, 2002

(86) PCT No.: PCT/FR02/04196

§ 371 (c)(1), (2), (4) Date: Dec. 6, 2004

(87) PCT Pub. No.: WO03/048066

PCT Pub. Date: Jun. 12, 2003

(65) Prior Publication Data

US 2005/0119395 A1    Jun. 2, 2005

(30) Foreign Application Priority Data

Dec. 5, 2001   (FR) .................................. 01 15686

(51) Int. Cl.
  C03C 17/02   (2006.01)
  B32B 9/00   (2006.01)
(52) U.S. Cl. ...................... 428/392; 428/375; 428/378; 428/391; 428/426; 524/494; 65/443; 65/444; 252/8.83; 252/8.81
(58) Field of Classification Search ................ 428/391, 428/392, 378, 375; 524/494; 65/381, 382, 65/384, 443, 444, 448, 453; 252/8.83, 8.81
See application file for complete search history.

(56) References Cited

U.S. PATENT DOCUMENTS

| 4,351,752 A | 9/1982 | Das et al. |
| 5,352,392 A | 10/1994 | Johnson et al. |
| 5,486,416 A | 1/1996 | Johnson et al. |
| 5,601,882 A | 2/1997 | Augier et al. |
| 5,611,836 A | 3/1997 | Moireau |
| 5,698,000 A | 12/1997 | Moireau et al. |
| 5,789,074 A | 8/1998 | Moireau et al. |
| 5,882,792 A | 3/1999 | Moireau |
| 5,955,195 A | 9/1999 | Moireau |
| 5,961,684 A | 10/1999 | Moireau et al. |
| 5,972,504 A | 10/1999 | Moireau et al. |
| 5,985,447 A | 11/1999 | Moireau |
| 5,989,711 A | 11/1999 | Moireau et al. |
| 6,187,435 B1 | 2/2001 | Moireau et al. |
| 6,316,058 B1 | 11/2001 | Moireau et al. |
| 6,322,888 B1 | 11/2001 | Moireau et al. |
| 6,514,612 B1 | 2/2003 | Moireau et al. |
| 6,846,563 B2 * | 1/2005 | Moireau ...................... 428/378 |
| 2005/0119395 A1 * | 6/2005 | Moireau ...................... 524/494 |
| 2006/0099417 A1 * | 5/2006 | Moireau et al. ............ 428/375 |

FOREIGN PATENT DOCUMENTS

FR   2 772 369   6/1999

* cited by examiner

*Primary Examiner*—Jill Gray
(74) *Attorney, Agent, or Firm*—Oblon, Spivak, McClelland, Maier & Neustadt, P.C.

(57) ABSTRACT

The invention relates to a sizing composition composed of a solution comprising at least 5% by weight of solvent and comprising a thermally curable base system, said system comprising at least 60% by weight of components with a molecular mass of less than 750 and at least 60% by weight of components of a mixture exhibiting at least one epoxy reactive functional group, at least one amine, preferably primary or secondary amine, reactive functional group, and at least one hydroxyl reactive functional group. Another subject matter of the invention relates to the glass strands coated with the abovementioned sizing composition. The glass strands obtained are capable of being used to reinforce organic or inorganic materials.

20 Claims, No Drawings

SIZING COMPOSITION FOR GLASS YARNS, THE GLASS YARNS THUS OBTAINED AND COMPOSITE MATERIALS COMPRISING SAID YARNS

The present invention relates to a sizing composition for glass strands, to the glass strands obtained and to the composites incorporating said glass strands.

The manufacture of reinforcing glass strands is carried out in a known way from streams of molten glass flowing from the orifices of spinnarets. These streams are drawn in the form of continuous filaments and then these filaments are gathered together into base strands, which are subsequently collected in various forms: bobbins of continuous strands, mats of continuous or cut strands, cut strands, and the like.

Before they are gathered together in the form of strands, the filaments are coated with a size by passing over a sizing device. The application of a size is necessary, first, for the production of the strands and, secondly, for the preparation of composites combining said strands, as reinforcing agent, and other organic and/or inorganic materials.

The size acts first as lubricant and protects the strands from the abrasion resulting from the high-speed rubbing of the strands over the various devices encountered in the abovementioned process. It is important for the glass strand to have an ability to slip ("a slip") which is sufficient to withstand the subsequent conversion operations, such as reeling off and winding off onto appropriate supports or weaving, so as to avoid as far as possible rubbing actions capable of breaking the filaments.

Another function of the size is to confer integrity on the above-mentioned strands, that is to say to bind the filaments to one another within the strands. This integrity is more particularly desired in textile applications, where the strands are subjected to strong mechanical stresses, in particular in tension. Thus, when the filaments show little attachment to one another, they have a tendency to break more easily when they are stressed, resulting in the formation of flock, which interferes with the operation of textile machinery, indeed even requires its complete shutdown. Furthermore, nonintegrated strands are regarded as difficult to handle, in particular when it relates to forming bobbins, as broken filaments then appear on the edges. In addition to the not very satisfactory esthetic appearance, it is more difficult to unwind the strands extracted from these bobbins.

Another role of the size is to promote the wetting and/or the impregnation of the strands by the materials to be reinforced, by creating bonds between the strands and these materials. The mechanical properties of the resulting composites depend on the quality of the adhesion of the material to the strands and on the ability of the strands to be wetted and/or impregnated by the material. In the majority of cases, the size makes it possible to obtain composites exhibiting improved mechanical properties.

The sizing compositions must also be compatible with the conditions for the production of the strands, which require in particular high drawing speeds for the filaments reaching several tens of meters per second. They must also withstand the shear forces induced by the passage of the filaments, in particular with regard to the viscosity, which must not significantly fluctuate, and must be capable of correctly wetting the surface of the filaments in order to obtain a uniform sheathing along their entire length. When they are intended to be cured, the sizing compositions must, in addition, remain stable at the temperatures beneath the spinnaret (of the order of 60 to 100° C.). In particular, it is desirable to see to it that the curable constituents have a low vapor pressure at the temperatures indicated in order to avoid problems of variation in concentration resulting from the evaporation of certain constituents. It is also important to control the degree of conversion, defined by the ratio of the number of functional groups which have reacted in the size to the number of starting reactive functional groups, in order to guarantee the production of sized glass strands of constant quality. The degree of conversion must in particular be very close to the expected theoretical degree, in order to prevent the size from changing over time.

As a general rule, the sizing compositions are chosen so as to fulfill the abovementioned roles and so as not to undergo chemical reactions resulting in a significant increase in the viscosity, both during storage at ambient temperature and under the higher temperature conditions beneath the spinnaret.

The sizes most commonly employed are low-viscosity aqueous sizes which are easy to use but which have to be deposited in a large amount on the filaments. The water generally represents more than 80% by weight of the size, which necessitates drying the strands before they are used as the water can, inter alia, lead to a reduction in the adhesion between the strands and the material to be reinforced. Drying by heat treatment is a lengthy and expensive operation which requires perfect adjustment to the conditions for the manufacture of the strands. Such a treatment is not neutral with regard to the sized strand. When the sized strand is in the form of wound packages in particular, there may occur a modification in the distribution of the constituents of the size by uneven and/or selective migration, a coloring of the strand and a deformation of the wound package. Deformation is also observed, in the absence of drying, on straight-edged wound packages (or rovings) of fine strands (linear density or yarn count of less than 600 tex (g/km)) coated with an aqueous size.

In order to solve the abovementioned problems, "anhydrous" sizing compositions, that is to say which comprise less than 5% by weight of solvent, have been proposed. Such compositions are disclosed for example, in the following patent applications:

FR-A-2 727 972 provides a composition for the sizing of glass strands which cures under the action of UV radiation or of an electron beam. This composition comprises a curable base system which comprises at least one component with a molecular mass of less than 750 exhibiting at least one epoxy functional group and comprising at least 60% by weight of one or more component(s) with a molecular mass of less than 750 exhibiting at least one epoxy, hydroxyl, vinyl ether, acrylic or methacrylic functional group.

FR-A-2 772 369 discloses a sizing composition for glass strands which does not require a heat treatment stage subsequent to the deposition on the strand. This composition comprises at least 60% by weight of components capable of curing, these components being, for at least 60% of them, components with a molecular mass of less than 750 and these curable components comprising at least a mixture of component(s) having at least one acrylic and/or methacrylic reactive functional group and of component(s) having at least one primary amine and/or secondary amine functional group, at least 20% by weight of these components exhibiting at least two acrylic, methacrylic, primary amine and/or secondary amine reactive functional groups.

The anhydrous compositions which have just been mentioned comprise a high proportion of monomers capable of curing at ambient temperature. Given that very little time, generally less than one second, elapses between the deposition of the composition on the glass filaments and the winding of the strand, the turns of the wound package are generally coated with an incompletely cured size. Under the conditions of direct winding of the strand to form a straight-edged wound package (rovings), the kinetics of curing are often insufficient to allow effective blocking of the first layers of strand. Under the effect of the accumulation of the following layers, the lower layers have a tendency to give way, thus resulting in a modification to the dimensional characteristics of the wound package during winding. The defects observed (deformation, increase in the length, and the like) render such wound packages unusable on the devices for which they are intended.

Under the conditions which have just been described, the sizing composition must be able to be deposited on the filaments in the liquid state and be able to change rapidly to a gel state during the winding of the strand. The time necessary to reach the gel state ("gel time") depends on the temperature at the time of the deposition, this temperature generally being of the order of 60 to 100° C. under the usual conditions for the production of the filaments. The gel time also depends on the type of wound package which it is desired to obtain and it can vary very substantially according to the way of assembling (straightness of the edges, crossing angle, and the like). Thus, a sizing composition intended to form straight-edged wound packages is regarded as satisfactory when its gel time, measured at ambient temperature (of the order of 25° C.), is between 10 and 40 minutes, preferably 15 and 30 minutes. When it is a matter of forming wound packages of the "cakes" type, the target is preferably a sizing composition exhibiting a greater gel time, of the order of 100 minutes. In addition, the gel time also has an influence on the final properties of the strand, in particular with regard to its integrity, which generally decreases as the curing reaction becomes faster.

The deposition of the sizing compositions based on the curing of epoxy compound(s) and of amine(s) can be carried out in two ways: either in a single stage, using a composition including all the epoxy and aminated reactive compounds, or in two stages, coating the filaments with a first composition comprising one type of reactive compound (epoxy or amine) and with a second composition including the other type of reactive compounds (amine or epoxy). Whatever the way chosen, it turns out that the gel time is relatively long, of the order of two hours or more.

It is possible to reduce the gel time by using compounds having a high reactivity, in particular primary amines, and/or by increasing the amount of these compounds in the composition. However, these amines are known to have a high degree of toxicity and a vapor pressure which is often high at the temperature of the deposition (of the order of 60 to 100° C., as indicated above). For this reason, it is preferable to limit their use in order to prevent any risk of harm to the health of the people working in such an environment.

It is an aim of the present invention to control the gel time of curable sizing compositions intended for the coating of glass strands which proceed by reaction of compound(s) including one or more epoxy functional groups, of compound(s) including one or more amine functional groups and of compounds including one or more hydroxyl functional groups, thus making it possible to adjust this time according to the applications targeted.

Another aim of the present invention is to provide a sizing composition in which the content of primary amine is kept as low as possible, while retaining a gel time compatible with the conditions for the production of the glass strand.

Another subject matter of the present invention is the glass strands coated with the abovementioned sizing composition, these strands exhibiting a high stiffness and a high integrity and being capable of efficiently reinforcing organic and/or inorganic materials for the purpose of forming composites.

The sizing composition according to the invention is composed of a solution comprising less than 5% by weight of solvent and comprising a thermally curable base system, said system comprising at least 60% by weight of components with a molecular mass of less than 750 and at least 60% by weight of components of a mixture:
   of component(s) exhibiting at least one epoxy reactive functional group,
   of component(s) exhibiting at least one amine, preferably primary or secondary amine, reactive functional group,
   and of component(s) exhibiting at least one hydroxyl reactive functional group.

In the present invention, the following expressions have the following meanings:

The term "solvent" is understood to mean water and organic solvents capable of being used to dissolve certain curable components. The presence of solvent(s) in a limited amount does not require a specific treatment to remove them. In most cases, the sizes according to the invention are completely devoid of solvent.

The terms "to cure", "curable", "curing", and the like, are understood to mean, respectively, "to cure and/or to crosslink", "curable and/or crosslinkable", "curing and/or crosslinking", and the like.

The term "reactive functional group" is understood to mean a functional group capable of being involved in the reaction for the curing of the size, it being possible for the curing to be carried out at the usual temperature for the production of the strands, that is to say without additional thermal contribution, which is preferred, or at a higher temperature (thermal curing).

The term "curable base system" is understood to mean the combined essential components which make it possible to obtain the expected cured structure of the size.

Subsequently, the terms "epoxy component(s)", "amine component(s)" and "hydroxyl component(s)" are understood to mean, respectively, "component(s) exhibiting at least one epoxy reactive functional group", "component(s) exhibiting at least one amine reactive functional group" and "component(s) exhibiting at least one hydroxyl reactive functional group".

The sizing composition according to the invention is compatible with the conditions for producing the glass strands imposed by the direct process, the viscosity of the composition being adjusted according to the drawing speed and the diameter of the filaments passed through it. The composition according to the invention also exhibits a rate of wetting on the strand compatible with the drawing speed of the strands.

As a general rule, the curable base system represents between 60 and 100% by weight of the sizing composition according to the invention, mainly between 75 and 100% by weight of the composition and, in the majority of cases, between 80 and 100% by weight of the composition.

The base system is predominantly composed (preferably to 80% by weight and up to 100% by weight in the majority of cases) of epoxy component(s), of amine component(s) and of hydroxyl component(s), the use of this mixture of components making it possible to obtain, after curing, polymers resulting from the reaction of the various amine, epoxy and hydroxyl functional groups of the starting constituents. In particular, these are epoxy-amine-hydroxyl terpolymers which are the predominant participants in the structure of the cured size, and the properties of the sized glass strands result directly from this structure.

In addition, the base system comprises a majority (preferably at least 70% by weight and up to 100% by weight) of component(s) with a molecular mass of less than 750, this/these component(s) normally, for the most part, belonging to the abovementioned epoxy, amine and hydroxyl components.

Preferably and generally according to the invention, the components with a molecular mass of less than 750 mentioned above have a molecular mass of less than 500.

When the base system includes components with a molecular mass of greater than 750, it advantageously comprises one or more epoxy components with a molecular mass of greater than 1 000 (prepolymers). The content of these components is generally less than 20% by weight of the sizing composition because, beyond this value, the viscosity as well as the reactivity of the composition become too great to allow the deposition of the size on the glass strands under the conditions of the abovementioned process.

According to certain embodiments, the base system according to the invention can optionally comprise a small proportion (less than 25%) of component(s) which participate in the structure of the cured size but which do not exhibit epoxy, amine or hydroxyl functional groups and/or which have a higher molecular mass. Preferably, the proportion of these components is less than 15% and better still is at least equal to 5%.

According to the preferred embodiment of the invention, which makes it possible to obtain particularly satisfactory results, the base system is composed of epoxy component(s), of amine component(s) including two amine reactive functional groups and of component(s) including at least one hydroxyl reactive functional group. In a particularly advantageous way, the amine functional groups are primary and/or secondary amine functional groups and better still primary amine functional groups.

Each of the epoxy, amine or hydroxyl components which can be used in the base system can exhibit one or more epoxy, amine or hydroxyl reactive functional groups.

The epoxy component or components of the base system can in particular be be chosen from:
  components including an epoxy functional group: glycidyl ethers, such as $C_4$-$C_{16}$ alkyl glycidyl ethers, for example 2-ethylhexyl glycidyl ether, lauryl glycidyl ether and acryloxyhexyl glycidyl ether, or aromatic glycidyl ethers, such as phenyl glycidyl ether, p-(tert-butyl)phenyl glycidyl ether, nonylphenyl glycidyl ether or cresyl glycidyl ether, or glycidyl esters of versatic acid, such as pivalic acid monoglycidyl ester or neodecanoic acid monoglycidyl ester,
  components including two epoxy functional groups: limonene dioxide, polyglycol diepoxides, diglycidyl ethers, such as 1,4-butanediol diglycidyl ether, neopentyl glycol diglycidyl ether, bromoneopentyl glycol diglycidyl ether, 1,6-hexanediol diglycidyl ether, cyclohexanedimethylol diglycidyl ether, resorcinol diglycidyl ether, bisphenol A diglycidyl ether or bisphenol F diglycidyl ether, diglycidyl esters, the diglycidyl ester of hexadihydrophthalic anhydride, diglycidylhydantoin, triglycidyl isocyanurate, epoxyphenol novolak resins and epoxycresol novolak resins,
  components including three epoxy functional groups: trimethylolethane triglycidyl ether, trimethylolpropane triglycidyl ether, triglycidyl ethers of palm oil, triphenylolmethane triglycidyl ether, triglycidyl ethers of p-amino-phenol, epoxyphenol novolak resins and epoxycresol novolak resins,
  components including at least four epoxy functional groups: polyepoxy polybutadienes, polyglycidyl ethers of aliphatic polyols, epoxyphenol novolak resins, epoxycresol novolak resins, tetra(para-glycidoxyphenyl)ethane, 4,4'-(diglycidylamino)diphenylmethane, N,N,N',N'-tetraglycidyl-A,A'-bis(4-aminophenyl)-p-diisopropylbenzène and N,N,N',N'-tetraglycidyl-A,A'-bis(4-amino-3,5-dimethylphenyl)-p-diisopropylbenzene.

Preference is given, among the epoxy components which have just been mentioned, to those which include one to three epoxy reactive functional groups.

As a general rule according to the invention, the proportion of epoxy component(s) in the base system is between 15 and 85% by weight of the sizing composition, mainly between 25 and 75% by weight approximately of the sizing composition. In the majority of cases, it is between 35 and 65% by weight of the sizing composition.

The amine component or components of the base system can be chosen from the components including one or more primary and/or secondary amine functional groups, such as:
  components comprising a linear, branched or cyclic hydrocarbonaceous chain, optionally comprising one or more heteroatoms and/or one or more unsaturations, for example ethylenediamine, hexamethylenediamine or poly(ethylene)polyamines, optionally alkoxylated, dipentylamine, diisopentylamine, dihexylamine, 2-butyl-2-ethyl-1,5-pentanediamine, N,N-bis(3-aminopropyl)methylamine, α-(2-aminomethylethyl)-ω-(2-(aminomethyl)ethoxy)poly(oxy(methyl-1,2ethanediyl), N'-(3-aminopropyl)-N,N'-dimethyl-1,3-propanediamine, C,C,C-trimethyl-1,6-hexanediamine, N-ethylmethallylamines, 2-piperidinone, cyanoguanidine, polyamidoamines and their derivatives, isophoronediamine, menthanediamine, N-aminoethylpiperazine, pyrrole, 1-(2-hydroxyethyl)-2-imidazolidinone, pyrazole, 2-methylpiperazine, aminoethylpiperazine, 2,6-dimethylmorpholine, N-aminoethylmorpholine, 2-propylimidazole, 2-isopropylimidazole and 2,6-diaminopyridine,
  and aromatic components, such as benzylamine, m- or p-phenylenediamine, m-xylylenediamine, diethyltoluenediamine, 4,4'-diaminodiphenylmethane, 3,3'-diaminodiphenylmethane, 4,4'-methylene-bis(2-chloroaniline), 4,4'-diaminodiphenyl sulfone, benzoguanamine and diamino-1-phenyl-1,3,3-trimethylindane.

It is also possible to use, as amine component(s) of the base system, one or more components including one or more tertiary amine functional groups, such as 2-phenyl-2-imidazoline, 2-ethylimidazole, 1,1-dimethoxy-N,N-dimethylmethanamine, N,N,N',N'-tetramethyl-4,4'-diaminodicyclohexylmethane, N,N,N',N",N"-pentamethyldiethylenetriamine, N,N-bis(2-hydroxyethyl)aniline, tetrabutylurea, 4-(diethylamino)benzoic acid and 1-methylpyrrolidine.

Preferably, the amine components are chosen from the components including one or more primary and/or secondary amine functional groups.

As a general rule according to the invention, the proportion of amine component(s) in the base system is greater than or equal to 5% by weight of the composition, in order to promote the cocuring reaction with the epoxy component (s). Generally, it is between 5 and 40% by weight of the sizing composition and, in the majority of cases, it is between 10 and 30% by weight of the sizing composition.

The hydroxyl component or components of the base system can be chosen from:

aliphatic or cycloaliphatic $C_3$-$C_{20}$ alcohols, such as fatty monoalcohols, preferably $C_8$-$C_{20}$ fatty monoalcohols, optionally including one or more oxyalkylene units, preferably oxyethylene units, diols, for example butanediol, pentanediol, hexanediol and cyclohexanediol, triols, for example glycerol and trimethylolpropane, and tetrols, for example pentaerythritol, alcohols including at least one aromatic ring, for example 4-(tert-butyl)phenol, resorcinol, bisphenol A, bisphenol F and bisphenol polyethers, poly(oxyalkylene)polyols, for example poly(oxyethylene)polyols, poly(oxypropylene)polyols and poly(oxyethylene)(oxypropylene)polyols, preferably including two or three hydroxyl functional groups, aminoalcohols comprising a linear or branched hydrocarbonaceous chain which can comprise one or more heteroatoms, for example 2-(2-aminoethyl)aminoethanol, 2-(2-(3-aminopropoxy)ethoxy)ethanol, 2-diisopropylaminoethanol, 3-aminopropanol, N-butyldiethanolamine, 2-amino-2-ethyl-1,3-propanediol, diisopropylamino-1,2-propanediol, 3-diethylamino-1,2-propanediol, tri(hydroxymethyl)aminomethane, triethanolamine and triisopropanolamine, and aromatic aminoalcohols, for example 4-aminophenol, dimethylaminophenol or tris(N,N,N-dimethylaminoethyl)phenol.

Preferably, according to the invention, the hydroxyl components are chosen from alcohols including at least two hydroxyl functional groups and better still two or three hydroxyl functional groups and aminoalcohols including one or more primary and/or secondary amine functional groups.

The proportion of hydroxyl component(s) in the base system varies within the same limits as that given above for the amine component(s).

Generally, the number of reactive sites of the epoxy components is greater than the number of reactive sites of the amine components. Likewise, the number of reactive sites of the epoxy components is greater than the number of sites of the hydroxyl components. Preferably, according to the invention, mainly in the case where the amine components of the base system are primary or secondary amine components, the ratio r of the number of epoxy reactive sites to the sum of the number of amine reactive sites and of the number of hydroxyl sites is between 0.2 and 2.5 (one epoxy functional group counting as one epoxy reactive site, one primary amine functional group counting as two amine reactive sites, one secondary amine functional group counting as one amine reactive site and one hydroxyl functional group counting as one hydroxyl reactive site).

In the majority of cases according to the invention, this ratio r is between 0.3 and 1.7, preferably between 0.4 and 1.3.

More generally, the ratio r' of the number of amine reactive sites to the number of hydroxyl reactive sites is between 0.5 and 20, preferably between 0.8 and 15.

The sizing composition can comprise, in addition to the base system, at least one catalyst which promotes the curing of the size by facilitating the opening of the epoxy functional groups. This catalyst is preferably chosen from weak bases, for example tertiary amines, which can also act as catalyst, such as trialkylamines, epoxyamines(N-(2,3-diepoxypropyl)aniline), N,N-dialkylalkanolamines, tertiary amino salts of polyacids, and the like.

The level of components acting solely as catalysts in the base system (that is to say, not participating in the structure of the cured size) is generally less than 8% by weight of the sizing composition, in the majority of cases less than 4% by weight. The presence of a catalyst makes it possible to use less reactive primary and/or secondary amine components. In the case of highly reactive amine components, such as N-aminoethylpiperazine, imidazole derivatives or menthanediamine, the presence of a catalyst is not necessary.

In addition to the abovementioned components, which participate essentially in the structure of the cured size, and, if appropriate, to the catalysts, the sizing composition can comprise one or more components (hereinafter denoted additives). These additives confer specific properties on the size and, when the composition is deposited in two stages, as is preferred, they can be introduced via one and/or other of the compositions constituting the size.

The composition according to the invention can comprise, as additive, at least one coupling agent which makes it possible to attach the size to the glass. The coupling agent can be a component of the base system, in which case it participates in the curing reaction, or a component which is involved only as additive.

The proportion of coupling agent(s) is generally between 0 and 30% by weight of the sizing composition and, in the majority of cases, greater than 5% by weight. It is preferably between 10 and 25% of the composition.

The coupling agent is generally chosen from silanes, such as γ-glycidoxypropyltrimethoxysilane, γ-acryloxypropyltrimethoxysilane, γ-methacryloxypropyltrimethoxysilane, poly(oxyethylene/oxypropylene)trimethoxysilane, γ-aminopropyltriethoxysilane, vinyltrimethoxysilane, phenylaminopropyltrimethoxysilane, styrylaminoethylaminopropyltrimethoxysilane or tert-butylcarbamoylpropyltrimethoxysilane, siloxanes, titanates, zirconates and mixtures of these compounds. Silanes are preferably chosen.

The composition can comprise, as additive, at least one textile processing agent added essentially as lubricant, and it is in many cases necessary in order for the composition to exhibit the functions of a size.

The proportion of textile processing agent is generally between 0 and 30% by weight of the composition and is preferably at least equal to 4%.

The textile processing agent is generally chosen from fatty esters, such as decyl laurate, isopropyl palmitate, cetyl palmitate, isopropyl stearate, isobutyl stearate, ethylene glycol adipate or trimethylolpropane trioctanoate, derivatives of alkylphenols, such as ethoxylated nonylphenol, derivatives of polyalkylene glycols, such as polyethylene glycol isostearate advantageously comprising less than 10 oxyethylene units, mixtures based on mineral oils, and mixtures of these compounds.

The composition according to the invention can also comprise, as additive, at least one film-forming agent which acts solely as slip agent facilitating the fiberizing, in particular by preventing significant rubbing of the filaments over the sizing device when these filaments are drawn at high speed and/or when they are very fine. However, this agent is expensive and may, in addition, result in a deterioration in the mechanical characteristics of the strands.

The proportion of the film-forming agent is generally less than or equal to 8% by weight of the composition and preferably less than or equal to 5%.

The film-forming agent is generally chosen from silicones and silicone derivatives, such as silicone oils, siloxanes and polysiloxanes, such as glycidyl(n)polydimethylsiloxane or α,ω-acryloxypolydimethylsiloxane, silicone polyacrylates, and mixtures of these compounds.

The composition according to the invention can comprise, as additive, at least one agent for adapting to the materials to be reinforced, for example a corrosion inhibitor, such as gallic acid or its derivatives, in the case of cement materials.

The composition according to the invention can be deposited on the glass filaments in one or more stages, for example under the conditions of the process disclosed in FR-A-2 763 328. In this process molten glass streams flowing from orifices positioned at the base of one or more spinnarets are drawn in the form of one or more sheets of continuous filaments and then the filaments are gathered together into one or more strands which is/are collected on one or more moving supports. The size is deposited by applying, to the filaments, a first stable composition with a viscosity of between 0.5 and 300 cP and at least one second stable composition with a viscosity of between 0.5 and 250 cP, introduced separately from the first composition.

The second composition can be deposited on the filaments at the earliest during the deposition of the first composition or on the strands at the latest when they are being collected on the supports. The difference in viscosity between the compositions is generally less than 150 cP.

The composition according to the invention is preferably applied in two stages, the first composition preferably comprising the epoxy component(s) and optionally one or more additives, and the second composition comprising the amine component(s) and the hydroxyl component(s) and optionally one or more additives, in particular the curing catalyst or catalysts.

It is particularly advantageous to deposit the size in two stages. This makes possible better control of the curing reactions and, for this reason, the size has a uniform quality along the entire length of the strands, while ensuring high productivity with a reduced risk of breakage of the strands.

As a general rule, the curing of the size deposited on the strand does not require an additional contribution of heat. However, it is possible to subject the strand after fiberizing to a heat treatment at different stages of the process for the purpose of accelerating the curing. This treatment can be applied to strands collected in the form of a wound package, on sheets of continuous or cut strands, or on strands in combination with an organic material for preparing composites. By way of illustration, for a roving weighing approximately 20 kg, treatment at a temperature of the order of 120 to 140° C. for approximately 8 hours proves to be satisfactory. For cut strands, the duration of treatment does not exceed approximately ten minutes at equivalent temperature.

The integrity proper of the strands, by adhesive bonding of the filaments constituting it, obtained after curing of the size is particularly high, whereas the level of size on the strands is relatively low. This is because the loss on ignition of the strands coated with the sizing composition in accordance with the invention does not exceed 3% by weight, preferably 1.5% by weight.

The degree of conversion of the amine components of the sizing composition according to the invention is close to 100%. Knowing the problems related to the toxicity of the amine compounds, to have available compositions with a residual content of these compounds of close to zero is an additional advantage.

The sized strands are generally collected in the form of wound packages on rotating supports, such as cakes, rovings and "cops". Whatever the state of curing of the size and the crossing angle, even when the latter is low (less than 1.5°), it is easy to reel off the strands originating from the wound packages and to handle them. The straight-edged wound packages retain their dimensional characteristics over time and do not undergo any deformation. The strands can also be used subsequently for the preparation of meshes, fabrics, braids, tapes, and the like.

The strands can also be collected on receiving supports moving translationally. They can in particular be thrown, by a device which also serves to draw them, toward the collecting surface which moves transversely to the direction of the drawn strands, for the purpose of producing a sheet of entangled continuous strands or "mat". The strands can also be cut before being collected by a device which also serves to draw them.

The glass filaments constituting these strands have a diameter which can vary to a large extent, generally from 5 to 30 µm. They can be composed of any glass, the most well known in the field of reinforcing strands being E glass and AR glass.

The strands obtained according to the invention can advantageously be used to reinforce various materials for the purpose of obtaining composite parts having high mechanical properties. The composites are obtained by combining at least glass strands according to the invention and at least one organic and/or inorganic material, the level of glass in the final composite generally varying from 1 to 5% by weight (cement matrix) and from 20 to 80% by weight and preferably 30 to 70% (organic matrix).

The examples which follow make it possible to illustrate the invention without, however, limiting it.

In these examples, the following analytical methods are used for the measurement of the physical properties of the sizing compositions and of the glass strands coated with the sizing composition according to the invention:

the gel time, expressed in minutes, is measured by means of a Trombomat device (sold by Prodemat S. A.). which plots the curve of viscosity of the sizing composition as a function of time. On this curve, the point of intersection between the tangent to the point of inflexion and the axis of the abscissae corresponds to the gel time.

the loss of ignition is measured according to the ISO 1887 standard. It is expressed in %.

the stiffness or rigidity is measured under the conditions defined by the ISO 3375 standard on 10 test specimens. It is expressed in mm. A strand exhibiting a stiffness of greater than or equal to 120 is suitable for a use requiring a high integrity of the strand.

the ability to be impregnated by a resin is evaluated visually on a scale ranging from 0 (bad; absence of wetting) to 5 (excellent; strand invisible in the resin).

the tensile strength is measured under the conditions defined by the ISO 3341 standard. It is expressed in g/tex.

EXAMPLE 1

Filaments with a diameter of 16 µm obtained by drawing streams of molten E glass flowing from a spinnaret (800 orifices) are coated with a first composition A and then with a second composition B (as percentage by weight):

| Composition A | |
|---|---|
| trimethylolpropane triglycidyl ether[1] | 22 |
| butanediol diglycidyl ether[2] | 10 |
| bisphenol F diglycidyl ether[3] | 7 |
| γ-methacryloxypropyltrimethoxysilane[4] | 12 |
| γ-glycidoxypropyltrimethoxysilane[5] | 8 |

| Composition B | |
|---|---|
| PEG 300 isostearate[6] | 18 |
| 1-(2-aminoethyl)piperazine | 15 |
| 2-amino-2-methyl-1-propanol | 8 |

The sizing composition exhibits a ratio r equal to 0.615, a ratio r' equal to 4.5 and a gel time of 51.5 minutes.

The filaments are gathered together into strands which are wound to form cakes (4 strands of 50 tex). The strands extracted from 6 of these cakes are used to form a strand of 1 200 tex, which exhibits a loss on ignition of 1.2%.

This strand exhibits a moderate integrity, a good ability to be cut by simultaneous throwing in the presence of resin and a low level of static electricity. Its ability to be impregnated by a polyester resin is evaluated at 1.5. The strand can be used as reinforcement in materials of the SMC (Sheet Molding Compound) type.

EXAMPLE 2

The procedure is the same as under the conditions of example 1, using the following compositions A and B:

| Composition A | |
|---|---|
| trimethylolpropane triglycidyl ether[1] | 18 |
| butanediol diglycidyl ether[2] | 12 |
| bisphenol F diglycidyl ether[3] | 4 |
| cresyl glycidyl ether[7] | 7 |
| γ-methacryloxypropyltrimethoxysilane[4] | 10 |
| γ-glycidoxypropyltrimethoxysilane[5] | 10 |

| Composition B | |
|---|---|
| 1-(2-aminoethyl)piperazine | 10 |
| 2-amino-2-methyl-1-propanol | 7 |
| poly(propylene oxide) with a molecular mass of 230[8] | 7 |
| mixture of trimethyl-1,6-hexanediamine, of m-xylylenediamine and of 4-tert-butylphenol[9] | 7 |
| bisphenol A polyether[10] | 4 |
| mixture of mineral oils and of surfactant[11] | 4 |

The sizing composition exhibits a ratio r equal to 0.592, a ratio r' equal to 6.32 and a gel time of 106 minutes.

The strands (4×50 tex) extracted from 6 cakes are used to form a strand of 1 200 tex, which exhibits a loss on ignition of 1.3%.

This strand has the same properties as that of example 1. In addition, when it is used in a cutting gun with simultaneous spraying of polyester resin, it does not give rise to any rods or to any sticking together of the cut strands.

EXAMPLE 3

The procedure is the same as under the conditions of example 1, using the following compositions A and B:

| Composition A | |
|---|---|
| trimethylolpropane triglycidyl ether[1] | 23 |
| butanediol diglycidyl ether[2] | 11 |
| bisphenol F diglycidyl ether[3] | 7 |
| γ-methacryloxypropyltrimethoxysilane[4] | 13 |
| γ-glycidoxypropyltrimethoxysilane[5] | 8 |

| Composition B | |
|---|---|
| PEG 300 isostearate[6] | 19 |
| 1-(2-aminoethyl)piperazine | 16 |
| 1,8-diazabicyclo[5.4.0]undec-7-ene | 3 |

The sizing composition exhibits a ratio r equal to 1.04, a ratio r' equal to 12.79 and a gel time of 90 minutes.

The strands (4×50 tex) extracted from 6 cakes are used to form a strand of 1 200 tex, which exhibits a loss on ignition of 1.3%.

This strand has a good integrity, can be easily cut and exhibits an acceptable level of static electricity. Its ability to be impregnated by a polyester resin is evaluated at 2.5. In addition, when it is used in a cutting gun with simultaneous spraying of polyester resin, it does not give rise to any rods and only on a few occasions are cut strands observed to be stuck together.

The strand can be used as reinforcement in materials of the SMC (Sheet Molding Compound) type.

EXAMPLE 4

The procedure is the same as under the conditions of example 1, using the following compositions A and B:

| Composition A | |
|---|---|
| trimethylolpropane triglycidyl ether[1] | 22 |
| butanediol diglycidyl ether[2] | 9 |
| cresyl glycidyl ether[7] | 10 |
| γ-methacryloxypropyltrimethoxysilane[4] | 8 |
| γ-glycidoxypropyltrimethoxysilane[5] | 8 |

| Composition B | |
|---|---|
| PEG 300 isostearate[6] | 12 |
| 1-(2-aminoethyl)piperazine | 8 |
| triethanolamine | 8 |
| mixture of trimethyl-1,6-hexanediamine, of m-xylylenediamine and of 4-tert-butylphenol[9] | 8 |
| 1,8-diazabicyclo[5.4.0]undec-7-ene | 7 |

The sizing composition exhibits a ratio r equal to 0.854, a ratio r' equal to 1.67 and a gel time of 18.6 minutes.

The filaments are gathered together into strands of 292 tex which are wound as cakes. The strands extracted from 2 of these cakes are used to form a strand of 665 tex, which exhibits a loss on ignition of 0.35%. The strand exhibits a tensile strength of 43 g/tex, a stiffness of 210 mm and content of volatile compounds of 0.06%.

This strand is subjected to a treatment intended to confer on it volume under the following conditions: diameter of the inlet and outlet nozzles equal to 0.8 and 2 mm respectively, air pressure: 6-6.5 bar, winding pressure: 1.5 bar, winding rate: 200 m/minute, degree of overfeeding of the drawing cups: 25%.

A slightly uneven slub with an average width of approximately 1 cm is obtained without the presence of flock.

EXAMPLE 5

The process is the same as under the conditions of example 4, using the following compositions A et B:

| Composition A | |
|---|---|
| trimethylolpropane triglycidyl ether[1] | 10 |
| butanediol diglycidyl ether[2] | 18 |
| bisphenol F diglycidyl ether[3] | 7 |
| γ-methacryloxypropyltrimethoxysilane[4] | 12 |
| γ-glycidoxypropyltrimethoxysilane[5] | 7 |

| Composition B | |
|---|---|
| 1-(2-aminoethyl)piperazine | 8 |
| 1,5-pentanediol | 15 |
| mixture of trimethyl-1,6-hexanediamine, of m-xylylenediamine and of 4-tert-butylphenol[9] | 7 |
| bisphenol A polyether[10] | 6 |
| mixture of mineral oils and of surfactant[11] | 10 |

The sizing composition exhibits a ratio r equal to 0.601, a ratio r' equal to 0.97 and a gel time of 42 minutes.

The filaments are gathered together into strands of 314 tex which are wound as cakes. The strands extracted from 2 of these cakes are used to form a strand of 660 tex, which exhibits a loss on ignition of 0.28%. The strand exhibits a tensile strength of 30.7 g/tex and a stiffness of 150 mm.

This strand is subjected to a treatment intended to confer on it volume under the following conditions: diameter of the inlet and outlet nozzles equal to 0.8 and 1.8 mm respectively, air pressure: 6 bar, winding pressure: 1.5 bar, winding rate: 200 m/minute, degree of overfeeding of the drawing cups: 20%.

An uneven slub with a width equal to approximately 1 cm is obtained without formation of flock.

EXAMPLE 6

The procedure is the same as under the conditions of example 4, using the following compositions A and B:

| Composition A | |
|---|---|
| trimethylolpropane triglycidyl ether[1] | 19 |
| butanediol diglycidyl ether[2] | 12 |
| bisphenol F diglycidyl ether[3] | 7 |
| γ-methacryloxypropyltrimethoxysilane[4] | 12 |
| γ-glycidoxypropyltrimethoxysilane[5] | 8 |

| Composition B | |
|---|---|
| 1-(2-aminoethyl)piperazine | 15 |
| 1,5-pentanediol | 15 |
| bisphenol A polyether[10] | 6 |
| mixture of mineral oils and of surfactant[11] | 6 |

The sizing composition exhibits a ratio r equal to 0.589, a ratio r' equal to 1.14 and a gel time of 20 minutes.

The filaments are gathered together into strands of 305 tex which are wound as cakes. The strands extracted from 2 of these cakes are used to form a strand of 640 tex, which exhibits a loss on ignition of 0.30%. The strand exhibits a tensile strength of 37 g/tex and a stiffness of 170 mm.

This strand is subjected to a treatment intended to confer on it volume under the following conditions: diameter of the inlet and outlet nozzles equal to 0.9 and 2 mm respectively, air pressure: 6.5 bar, winding pressure: 1.5 bar, winding rate: 200 m/minute, overfeeding of the drawing cups: 26.6%.

An even slub with a slight increase in volume is obtained.

It is observed, in the preceding examples, that it is possible to vary the gel time of the glass strands coated with the size according to the invention within a wide range of values. Thus, with the same base system, by adjusting the content of amine components and of hydroxyl components, it is possible in particular to obtain a comparable gel time with catalyst (examples 3 and 4) or without catalyst (examples 2 and 6).

In addition, the gel time can be adjusted by the choice of the hydroxyl component or components. Thus, it is found that the use of a diol comprising a short hydrocarbonaceous chain makes it possible to reduce the gel time by a factor of approximately 4.5 (examples 3 and 6).

(1) Sold under the reference "Araldite DY 0396" by Vantico
(2) Sold under the reference "Araldite DY 0397" by Vantico
(3) Sold under the reference "Araldite GY 285" by Vantico
(4) Sold under the reference "Silquest A 174" by Crompton
(5) Sold under the reference "Silquest A 187" by Crompton
(6) Sold under the reference "LDM 1018" by Seppic
(7) Sold under the reference "Heloxy 62" by Shell
(8) Sold under the reference "Jeffamine D 230" by Huntsman
(9) Sold under the reference "Ancamine 2089 M" by Air Products
(10) Sold under the reference "Simulsol BPPE" by Seppic
(11) Sold under the reference "Torfil LA 4" by Lamberti The present application is based on PCT/FR02/04196 and is the U.S. counterpart of WO 03/048066, the text of which is incorporated by reference. The application claims priority of the French Application No. 01 15686 filed on Dec. 5, 2001, the text of which is incorporated by reference.

The invention claimed is:

1. A glass strand coated with a sizing composition which comprises a solution comprising less than 5% by weight of solvent and comprising a thermally curable base system, said system comprising at least 60% by weight of components with a molecular mass of less than 750 and at least 60% by weight of components of a mixture:
   of (1) at least one component comprising at least one epoxy reactive functional group,
   of (2) at least one component comprising at least one amine reactive functional group,
   and of (3) at least one component comprising at least one hydroxyl reactive functional group, wherein said base system, upon curing, forms an epoxy-amine-hydroxyl terpolymer.

2. The glass strand as claimed in claim 1, wherein the content of said thermally curable base system is between 75 and 100% by weight of the composition.

3. The glass strand as claimed in claim 1, wherein said thermally curable base system is composed of 80% to 100% by weight of said mixture.

4. The glass strand as claimed in claim 1, wherein said thermally curable base system comprises at least 70% by weight said components with a molecular mass of less than 750.

5. The glass strand as claimed in claim 1, wherein the ratio r of the number of epoxy reactive sites to the sum of the number of amine reactive sites and of the number of hydroxyl sites is between 0.2 and 2.5.

6. The glass strand as claimed in claim 1, wherein the ratio r' of the number of amine reactive sites to the number of hydroxyl reactive sites is between 0.5 and 20.

7. The glass strand as claimed in claim 1, wherein the content of said (1) is between 15 and 85% by weight of the sizing composition.

8. The glass strand as claimed in claim 1, wherein the content of said (2) is greater than or equal to 5% by weight of the sizing composition.

9. The glass strand as claimed in claim 1, wherein the content of said (3) is greater than or equal to 5% by weight of the sizing composition.

10. The glass strand as claimed in claim 1, wherein said sizing composition additionally comprises a catalyst in a proportion of less than 8% by weight.

11. The glass strand as claimed in claim 1, wherein said sizing composition additionally comprises a coupling agent in proportions of between 0 and 30% by weight.

12. The glass strand as claimed in claim 1, wherein said sizing composition additionally comprises a textile processing agent in proportions of between 0 and 30% by weight.

13. The glass strand as claimed in claim 1, wherein said sizing composition additionally comprises a film-forming agent in a proportion of less than or equal to 8% by weight.

14. The glass strand as claimed in claim 1, wherein said sizing composition comprises at least one corrosion inhibitor.

15. The glass strand as claimed in claim 1, wherein said thermally curable base system, wherein (2) includes two amine reactive functional groups.

16. The glass strand as claimed in claim 1, wherein said amine reactive functional groups are primary and/or secondary amine reactive functional groups.

17. A sizing composition, which comprises a solution comprising less than 5% by weight of solvent and comprising a thermally curable base system, said system comprising at least 60% by weight of components with a molecular mass of less than 750 and at least 60% by weight of components of a mixture:

of (1) at least one component comprising at least one epoxy reactive functional group, of (2) at least one component comprising at least one amine reactive functional group, and of (3) at least one component comprising at least one hydroxyl reactive functional group, wherein said base system, upon curing, forms an epoxy-amine-hydroxyl terpolymer.

18. A composite comprising at least one organic and/or inorganic material and sized glass strands, wherein all or a portion of the glass strands comprise the sized glass strands as claimed in claim 1.

19. The glass strand as claimed in claim 14, wherein the corrosion inhibitor comprises gallic acid or a derivative thereof.

20. The sizing composition as claimed in claim 17, wherein said amine reactive functional groups are primary and/or secondary amine reactive functional groups.

* * * * *